July 29, 1952      E. F. HENRY      2,604,717
ARTIFICIAL BAIT
Filed June 16, 1948
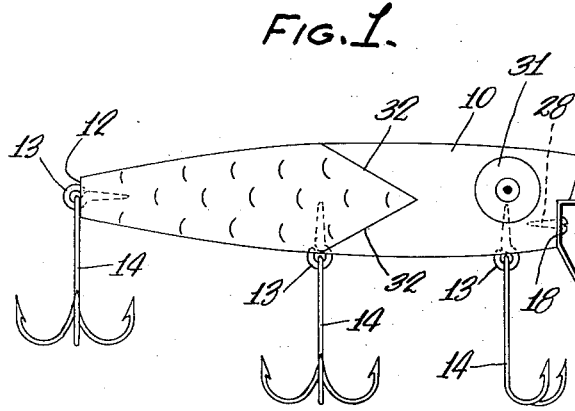
FIG. 1.
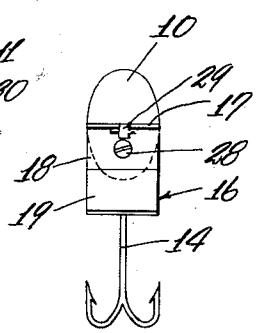
FIG. 2.
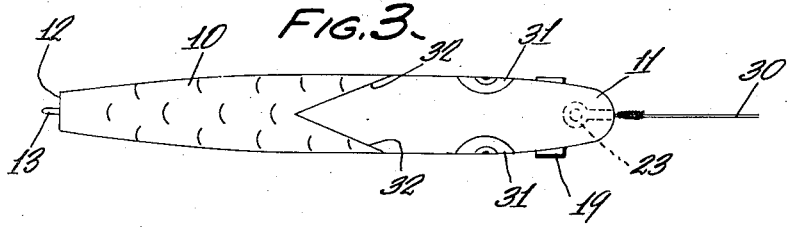
FIG. 3.
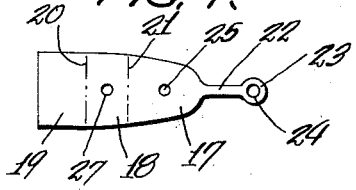
FIG. 4.
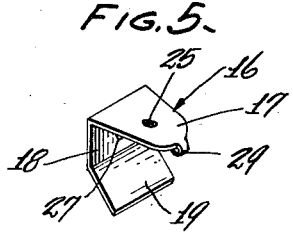
FIG. 5.
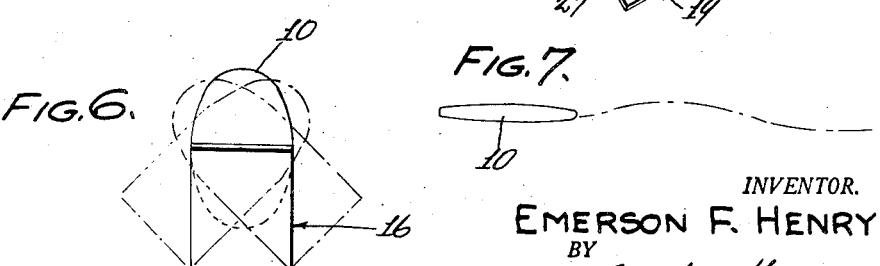
FIG. 6.
FIG. 7.
INVENTOR.
EMERSON F. HENRY
BY
Michael Williams
ATTORNEY Patented July 29, 1952

2,604,717

UNITED STATES PATENT OFFICE 2,604,717

ARTIFICIAL BAIT

Emerson F. Henry, Warren, Ohio

Application June 16, 1948, Serial No. 33,331

1 Claim. (Cl. 43—42.47)

My invention relates to artificial bait, and the principal object of my invention is to provide new and improved bait of this character.

The prior art is replete with artificial bait of various types, each claimed as having some attribute that will lure fish. In some cases, certain claims were well founded in theory, but the bait was impractical in operation.

The bait of my invention may be termed as the "floater type," and is especially, although not restrictively designed for fishing in shallow water, especially in water where there are weeds, stumps, logs, and like habitat of fish.

The body of the bait of my invention is preferably shaped to resemble natural bait of great liking to fish, as for instance the chub or creek shiner. In the drawing illustrating the invention, the body is preferably oval-shaped in cross-section, and is formed with what might be termed a diving plane device at its mouth portion.

The construction of my bait is such that a lifelike action is produced in the water, thus producing the maximum in killing power. For example, because of my particular construction, the bait may be caused to dive, not too sharply, to a depth dependant upon the speed at which the bait is retrieved by the fisherman.

Unlike the diving plane device shown in the Pflueger Patent 1,615,803, the diving plane device of my invention has a relatively large flat surface presented normal to the line of retrieve, so as to set up ripples emanating from the bait, and such ripples cause the substantially oval shape body to roll, causing a flashing of eyes on either side of the body, which action is greatly attractive to fish. Also, the diving plane of the particular construction shown, in combination with the particular construction of the body of the bait causes the bait to follow an undulating path during retrieve, and such action greatly attracts the attention of fish to the bait.

In the drawing accompanying this specification, and forming a part of this application, there is shown, for purposes of illustration, an embodiment which my invention may assume, and in this drawing:

Figure 1 is a side view of the preferred form of my invention,

Figure 2 is a front view of such preferred form,

Figure 3 is a plan view of such form,

Figure 4 is plan view of a development of the diving plane device,

Figure 5 is a perspective view of the diving plane device in the shape assumed when ready for assembly with the body of the bait, Figure 6 is a schematic front view illustrating the rolling action produced, and Figure 7 is a schematic plan view illustrating the undulating action produced.

Referring to the drawing, the embodiment herein shown to disclose the invention comprises a body 10, preferably shaped to simulate a chub or creek shiner. As best seen in Figures 1 through 3, the body 10 is generally oval in cross-section, and of elongated shape, being generally half-round at the head portion 11 and tapering to the tail portion 12.

Extending from the tail portion 12, and from the body 10, as screw-eyes 13, and gang hooks 14 depend from respective eyes 13. As here shown, the hook 14 adjacent to the head portion 11 has two hooks, while the remainder are of the three hook type, although such arrangement may be varied, as will be appreciated.

The lower part, referring to disposition of parts in Figures 1 and 2, of the head portion 11 is formed with a generally L-shaped notch 15, providing a horizontal surface disposed substantially at the longitudinal axis of the body 10, and a vertical surface generally at right angles to the horizontal surface.

A diving plane device 16 is secured in the notch 15, and comprises (referring to Figure 1) a generally horizontal leg 17 and a generally vertical leg 18 which terminates generally at the adjacent lower surface of the body 11, and is extended downwardly in a diving plane 19 which extends forwardly at approximately a thirty degree angle with the leg 18.

Preferably, the diving plane device 16 is formed of a bendable material and in one piece. In the present embodiment the device 16 is formed of high light-reflecting material, such as polished chrome-plated metal.

Referring to Figure 4, the diving plane device is formed from a flat blank which is suitably contoured to assume the shape of the corresponding parts of the body 10. The legs 17, 18, and 19 are formed by proper bending along lines 20, 21. Extending forwardly from the leg 17 is a neck portion 22 terminating in an eyelet portion 23 providing an aperture 24.

To properly form the neck portion, the legs 17, 18, and 19 are bent to their relative positions, and the neck portion is doubled upon itself so that the aperture 24 of the eyelet portion 23 registers with an aperture 25 formed in the leg 17, these two apertures passing a screw 26 which fastens the leg 17 and eyelet portion 23 to the horizontal surface of the notch 15. The leg 18 is also formed with an aperture 27, to pass a screw 28 for the purpose of fastening the leg 18 to the vertical surface of the notch 15. The doubled part of the neck portion 22 forms a loop 29 which is adapted to receive the leader or fish line 30.

The body 10 is provided with eyes 31 on either side thereof and above the longitudinal axis, and such eyes may be formed of glass or plastic set into the body, or they may merely be painted on the body, using color to give life-like appearance. As here shown, the eyes 31 are preferably positioned above the front hook 14.

Angular lines 32 may be painted on the body 10, and these lines may constitute a meeting place for different shades of paint in the two sections of the body defined by the lines. Thus, one section may be painted a light color to attract fish during a dull day, and the other section may be painted a dark color, to attract fish during a bright day.

At the rear section of the body, that is, the section extending inwardly from the tail portion 12, markings simulating fish scales may be painted thereon. One manner of providing such fish-scale appearance is to blow or spray a metal dust, preferably of gold-like color, onto the rear section while the paint on the body is still wet or tacky.

The body 11 may be formed of any suitable material which will float on water. Wood is a suitable material, although it will be appreciated that a plastic may also be used. Attention is called to the fact that the legs 18 and 19 of the diving plane device 16 are generally as wide as the widest part of the body 10, as best seen in Figure 2.

The leg 18 is of substantial length, to present a relatively large flat surface normal to the line of retrieve. Such surface causes considerable rippling action of the water as the bait is retrieved, and such rippling action causes the body 10 not only to turn or roll about its longitudinal axis, as suggested in Figure 6, but also causes the body 10 to follow an undulating path as suggested in Figure 7. Turning of the body 10 on its longitudinal axis gives the eyes 31 a flashing appearance to the fish, since from a predetermined viewing point, the eyes will appear, vanish, and reappear, and this action greatly attracts the fish to strike.

The leg 19, forming the diving plane proper, being at relatively small angular relation with the leg 18, assists in forming water ripples. Further, if the bait is retrieved with a predetermined amount of speed, the leg 19 will cause the bait to descend in the water.

In view of the foregoing, it will be apparent to those skilled in the art that I have accomplished at least the principal object of my invention, and it also will be apparent to those skilled in the art that the embodiment herein described may be variously changed and modified, without departing from the spirit of the invention, and that the invention is capable of uses and has advantages not herein specifically described, hence it will be appreciated that the herein disclosed embodiment is illustrative only, and that my invention is not limited thereto.

I claim:

An artificial bait, comprising: a body generally oval in cross-section and shaped to natural bait configuration, said body having an L-shaped notch entering from the head portion thereof and comprising a longitudinal surface extending inwardly of said head portion, said longitudinal surface being disposed along the transverse axis of said body and being parallel to the longitudinal axis thereof, and a transverse surface at right angles to said longitudinal surface, said transverse surface extending from the inner terminus of said longitudinal surface to the outer transverse peripheral surface of said body; a diving plane device secured within said notch, formed of a flat blank and providing a first leg adapted to lie along said longitudinal surface in manner so that the longitudinal axis of said body lies in the exposed surface of said first leg, a second leg adapted to lie along said transverse surface and extending the full length thereof, and a diving plane surface extending downwardly and forwardly from the outer terminus of said second leg, said blank also having a neck portion terminating in an eyelet, said neck portion being doubled back upon itself to form a loop for receiving a leader or line and in manner so that said loop is aligned with the longitudinal axis of said body and said eyelet is disposed beneath said first leg to provide means for securing said diving plane device within the aforesaid notch.

EMERSON F. HENRY.

REFERENCES CITED

The following references are of record in the file of this patent:

UNITED STATES PATENTS

| Number | Name | Date |
|---|---|---|
| 956,872 | Alger | May 3, 1910 |
| 1,352,054 | Dills | Sept. 7, 1920 |
| 1,423,025 | Rogers | July 18, 1922 |
| 1,499,819 | Goble | July 1, 1924 |
| 1,615,803 | Pflueger | Jan. 25, 1927 |
| 1,846,355 | Pemberton | Feb. 23, 1932 |
| 1,941,370 | Vann | Dec. 26, 1933 |
| 2,001,652 | Bird | May 14, 1935 |
| 2,189,958 | Middlemiss | Feb. 13, 1940 |
| 2,196,508 | Steinhoff | Apr. 9, 1940 |
| 2,416,834 | Kuslich | Mar. 4, 1947 |